(12) United States Patent
Wan et al.

(10) Patent No.: US 9,946,574 B2
(45) Date of Patent: Apr. 17, 2018

(54) SYSTEM FOR ADAPTIVE DETERMINATION OF COMPUTING RESOURCES AND METHOD THEREFOR

(71) Applicant: WAL-MART STORES, INC., Bentonville, AR (US)

(72) Inventors: Shenghua Wan, Santa Clara, CA (US); Prijith Chandran, San Jose, CA (US); Varun Srivastava, Sunnyvale, CA (US)

(73) Assignee: WAL-MART STORES, INC., Bentonville, AR (US)

(*) Notice: Subject to any disclaimer, the term of this patent is extended or adjusted under 35 U.S.C. 154(b) by 107 days.

(21) Appl. No.: 14/987,444

(22) Filed: Jan. 4, 2016

(65) Prior Publication Data
US 2017/0192820 A1  Jul. 6, 2017

(51) Int. Cl.
*G06F 9/46* (2006.01)
*G06F 9/455* (2006.01)
*G06F 9/50* (2006.01)

(52) U.S. Cl.
CPC .......... *G06F 9/5027* (2013.01); *G06F 9/5077* (2013.01)

(58) Field of Classification Search
None
See application file for complete search history.

(56) References Cited

U.S. PATENT DOCUMENTS

| | | | |
|---|---|---|---|
| 2015/0113539 A1* | 4/2015 | Agarwal | G06F 9/5027 718/104 |
| 2016/0110224 A1* | 4/2016 | Cao | G06F 11/3003 718/104 |
| 2017/0039236 A1* | 2/2017 | Li | G06F 17/30374 |

* cited by examiner

*Primary Examiner* — Lewis A Bullock, Jr.
*Assistant Examiner* — Melissa Alfred
(74) *Attorney, Agent, or Firm* — Bryan Cave LLP (57) ABSTRACT

A system and method for adaptive determination of computing resources is presented. Sometimes, computing jobs are to be allocated among a set of computers. Historical information regarding input data size and output data size is retrieved. Capacity information about each machine is retrieved. A weighted function is used to calculate a desired allocation of computing resources based on historical input data size and output data size. Computing resources are allocated based on the calculated allocation. The computing job can be performed on the allocated computing resources. Other embodiments also are disclosed.

15 Claims, 6 Drawing Sheets

ABSTRACT

SYSTEM FOR ADAPTIVE DETERMINATION OF COMPUTING RESOURCES AND METHOD THEREFOR

TECHNICAL FIELD

This disclosure relates generally to computers, and relates more particularly to adaptively determining an amount of computing resources needed.

BACKGROUND

Computing resources are finite. If computing resources are not allocated efficiently, the result can be negative, ranging from inefficient usage of resources to slowing down of computations because of an inefficient calculation. It would be desirable to have a system and method that more efficiently allocated computing resources.

BRIEF DESCRIPTION OF THE DRAWINGS

To facilitate further description of the embodiments, the following drawings are provided in which.

For simplicity and clarity of illustration, the drawing figures illustrate the general manner of construction, and descriptions and details of well-known features and techniques might be omitted to avoid unnecessarily obscuring the present disclosure. Additionally, elements in the drawing figures are not necessarily drawn to scale. For example, the dimensions of some of the elements in the figures might be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but might include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements can be electrically coupled together, but not be mechanically or otherwise coupled together. Coupling can be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

DESCRIPTION OF EXAMPLES OF EMBODIMENTS

Some embodiments include a system. The system can include: one or more processing modules; and one or more non-transitory memory storage modules storing computing instructions configured to run on the one or more processing modules and perform the acts of: receiving first data regarding historical data of input size for a particular computing task; receiving second data regarding historical data of output size for the particular computing task; receiving capacity data indicating a capacity of each computing machine of a set of computing machines; determining a desired number of computing machines to assign to a computing job in view of the first data, second data, and the capacity data; and allocating the desired number of computing machines of the set of computing machines to the computing job.

Some embodiments include a method. The method can include: receiving first data regarding historical data of input size for a particular computing task; receiving second data regarding historical data of output size for the particular computing task; receiving capacity data indicating a capacity of each computing machine of a set of computing machines; determining a desired number of computing machines to assign to a computing job in view of the first data, second data, and the capacity data; and allocating the desired number of computing machines of the set of computing machines to the computing job.

Some embodiments include a computer readable storage medium having data stored therein representing software executable by a computer. The storage medium can comprise: instructions for receiving first data regarding historical data of input size for a particular computing task; instructions for receiving second data regarding historical data of output size for the particular computing task; instructions for receiving capacity data indicating a capacity of each computing machine of a set of computing machines; instructions for determining a desired number of computing machines to assign to a computing job in view of the first data, second data, and the capacity data; and instructions for allocating the desired number of computing machines of the set of computing machines to the computing job.

Figure 1:
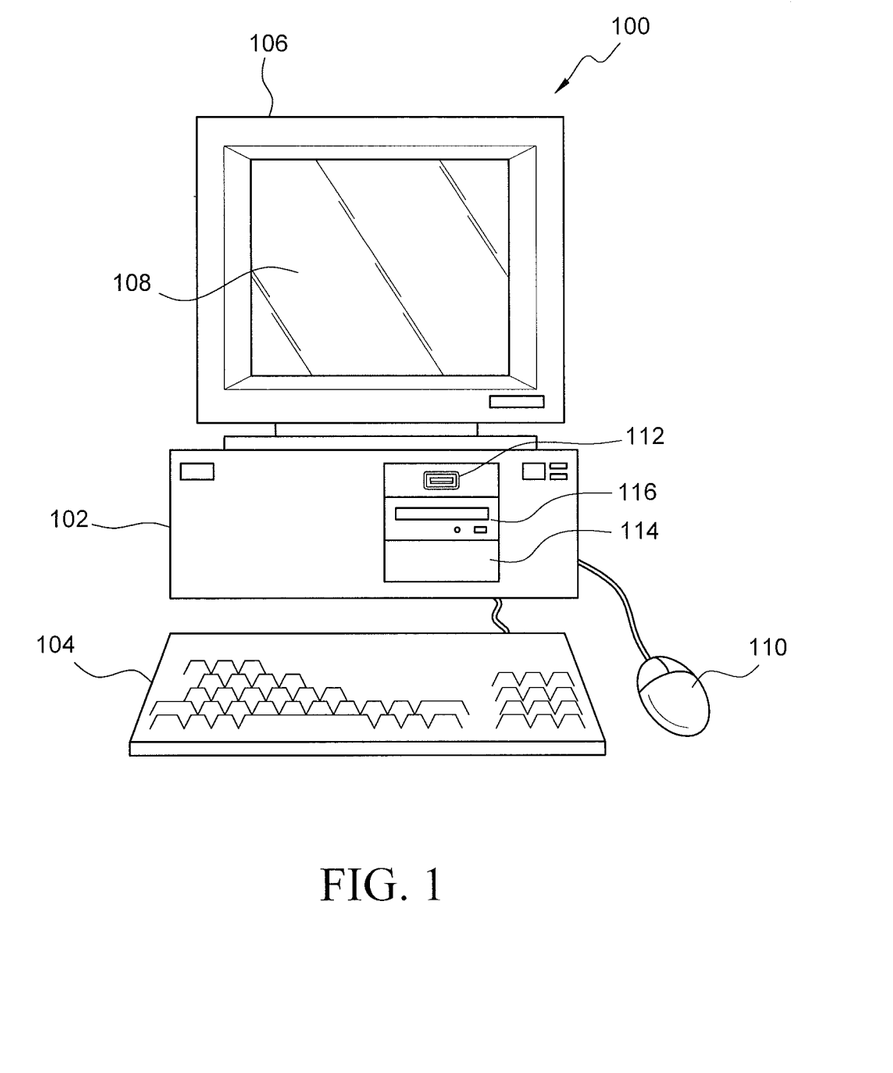
FIG. 1 illustrates a front elevation view of a computer system that is suitable for implementing at least part of a central computer system.
Figure 2:
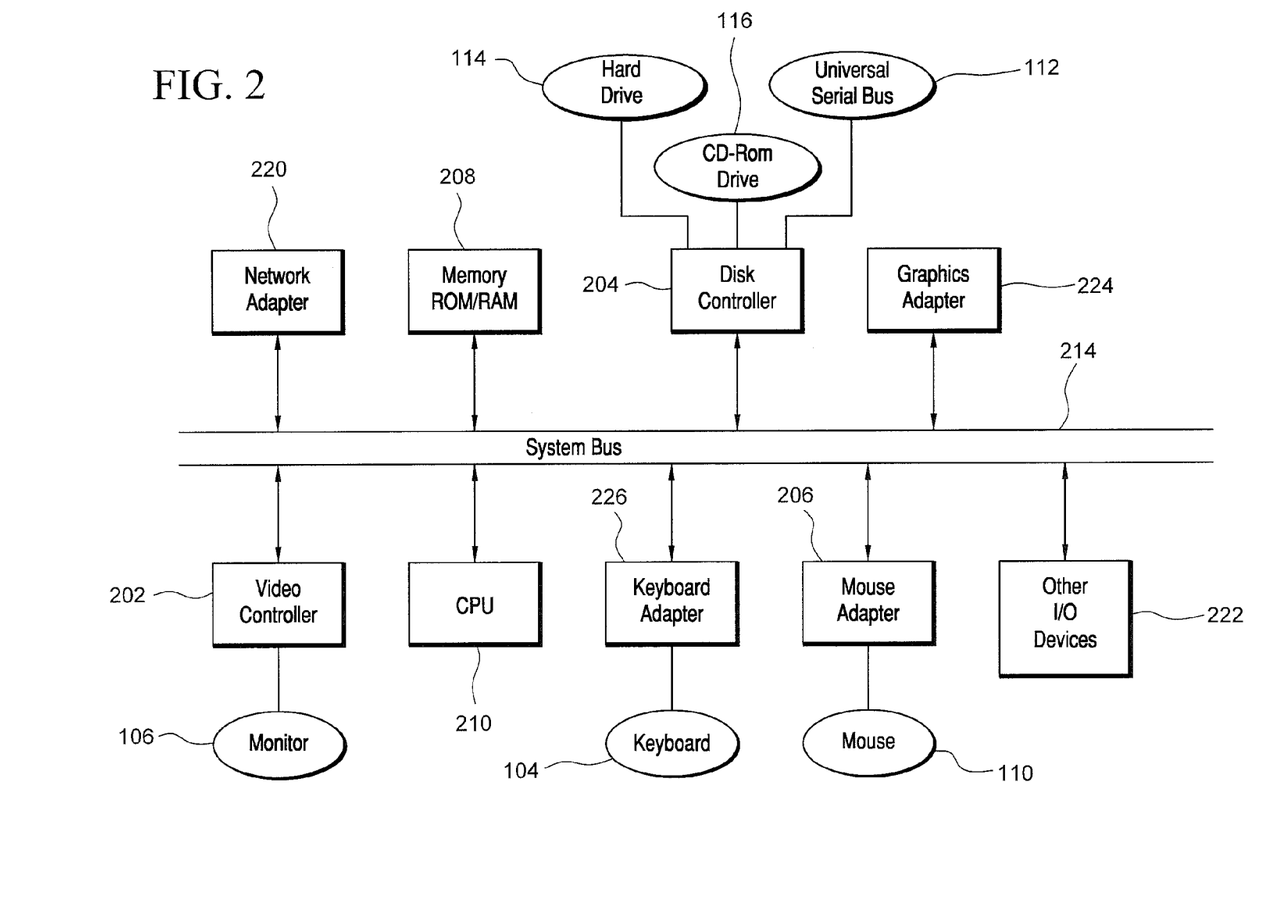
FIG. 2 illustrates a representative block diagram of exemplary elements included on the circuit boards inside a chassis of the computer system of FIG. 1.

Turning to the drawings, FIG. 1 illustrates an exemplary embodiment of a computer system 100, all of which or a portion of which can be suitable for (i) implementing part or all of one or more embodiments of the techniques, methods, and systems and/or (ii) implementing and/or operating part or all of one or more embodiments of the memory storage modules described herein. As an example, a different or separate one of a chassis 102 (and its internal components) can be suitable for implementing part or all of one or more embodiments of the techniques, methods, and/or systems described herein. Furthermore, one or more elements of computer system 100 (e.g., a monitor 106, a keyboard 104, and/or a mouse 110, etc.) also can be appropriate for implementing part or all of one or more embodiments of the techniques, methods, and/or systems described herein. Computer system 100 can comprise chassis 102 containing one or more circuit boards (not shown), a Universal Serial Bus (USB) port 112, a Compact Disc Read-Only Memory (CD-ROM) and/or Digital Video Disc (DVD) drive 116, and a drive 114. Drive 114 can be a hard drive that uses spinning magnetic disks to store data or it can be a solid state drive (SSD) that uses a fast, non-volatile memory for storage. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to a memory storage unit 208, where memory storage unit 208 can comprise (i) non-volatile memory, such as, for example, read only memory (ROM) and/or (ii) volatile memory, such as, for example, random access memory (RAM). The non-volatile memory can be removable and/or non-removable non-volatile memory. Meanwhile, RAM can include dynamic RAM (DRAM), static RAM (SRAM), etc. Further, ROM can include mask-programmed ROM, programmable ROM (PROM), one-time programmable ROM (OTP), erasable programmable read-only memory (EPROM), electrically erasable programmable ROM (EEPROM) (e.g., electrically alterable ROM (EAROM) and/or flash memory), etc. The memory storage module(s) of the various embodiments disclosed herein can comprise memory storage unit 208, an external memory storage drive (not shown), such as, for example, a USB-equipped electronic memory storage drive coupled to universal serial bus (USB) port 112 (FIGS. 1-2), drive 114 (FIGS. 1-2), CD-ROM and/or DVD drive 116 (FIGS. 1-2), a floppy disk drive (not shown), an optical disc (not shown), a magneto-optical disc (now shown), magnetic tape (not shown), etc. Further, non-volatile or non-transitory memory storage module(s) refer to the portions of the memory storage module(s) that are non-volatile memory.

In various examples, portions of the memory storage module(s) of the various embodiments disclosed herein (e.g., portions of the non-volatile memory storage module(s)) can be encoded with a boot code sequence suitable for restoring computer system 100 (FIG. 1) to a functional state after a system reset. In addition, portions of the memory storage module(s) of the various embodiments disclosed herein (e.g., portions of the non-volatile memory storage module(s)) can comprise microcode such as a Basic Input-Output System (BIOS) operable with computer system 100 (FIG. 1). In the same or different examples, portions of the memory storage module(s) of the various embodiments disclosed herein (e.g., portions of the non-volatile memory storage module(s)) can comprise an operating system, which can be a software program that manages the hardware and software resources of a computer and/or a computer network. The BIOS can initialize and test components of computer system 100 (FIG. 1) and load the operating system. Meanwhile, the operating system can perform basic tasks such as, for example, controlling and allocating memory, prioritizing the processing of instructions, controlling input and output devices, facilitating networking, and managing files. Exemplary operating systems can comprise one of the following: (i) Microsoft® Windows® operating system (OS) by Microsoft Corp. of Redmond, Wash., United States of America, (ii) Mac® OS X by Apple Inc. of Cupertino, Calif., United States of America, (iii) UNIX® OS, and (iv) Linux® OS. Further exemplary operating systems can comprise one of the following: (i) the iOS® operating system by Apple Inc. of Cupertino, Calif., United States of America, (ii) the Blackberry® operating system by Research In Motion (RIM) of Waterloo, Ontario, Canada, (iii) the WebOS operating system by LG Electronics of Seoul, South Korea, (iv) the Android™ operating system developed by Google, of Mountain View, Calif., United States of America, (v) the Windows Mobile™ operating system by Microsoft Corp. of Redmond, Wash., United States of America, or (vi) the Symbian™ operating system by Accenture PLC of Dublin, Ireland.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processing modules of the various embodiments disclosed herein can comprise CPU 210.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to keyboard 104 (FIGS. 1-2) and mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM drive 116 (FIGS. 1-2). In other embodiments, distinct units can be used to control each of these devices separately.

Network adapter 220 can be suitable to connect computer system 100 (FIG. 1) to a computer network by wired communication (e.g., a wired network adapter) and/or wireless communication (e.g., a wireless network adapter). In some embodiments, network adapter 220 can be plugged or coupled to an expansion port (not shown) in computer system 100 (FIG. 1). In other embodiments, network adapter 220 can be built into computer system 100 (FIG. 1). For example, network adapter 220 can be built into computer system 100 (FIG. 1) by being integrated into the motherboard chipset (not shown), or implemented via one or more dedicated communication chips (not shown), connected through a PCI (peripheral component interconnector) or a PCI express bus of computer system 100 (FIG. 1) or USB port 112 (FIG. 1).

Returning now to FIG. 1, although many other components of computer system 100 are not shown, such components and their interconnection are well known to those of ordinary skill in the art. Accordingly, further details concerning the construction and composition of computer system 100 and the circuit boards inside chassis 102 are not discussed herein.

Meanwhile, when computer system 100 is running, program instructions (e.g., computer instructions) stored on one or more of the memory storage module(s) of the various embodiments disclosed herein can be executed by CPU 210 (FIG. 2). At least a portion of the program instructions, stored on these devices, can be suitable for carrying out at least part of the techniques and methods described herein.

Further, although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile device, such as a smartphone. In certain additional embodiments, computer system 100 may comprise an embedded system.

Figure 3:
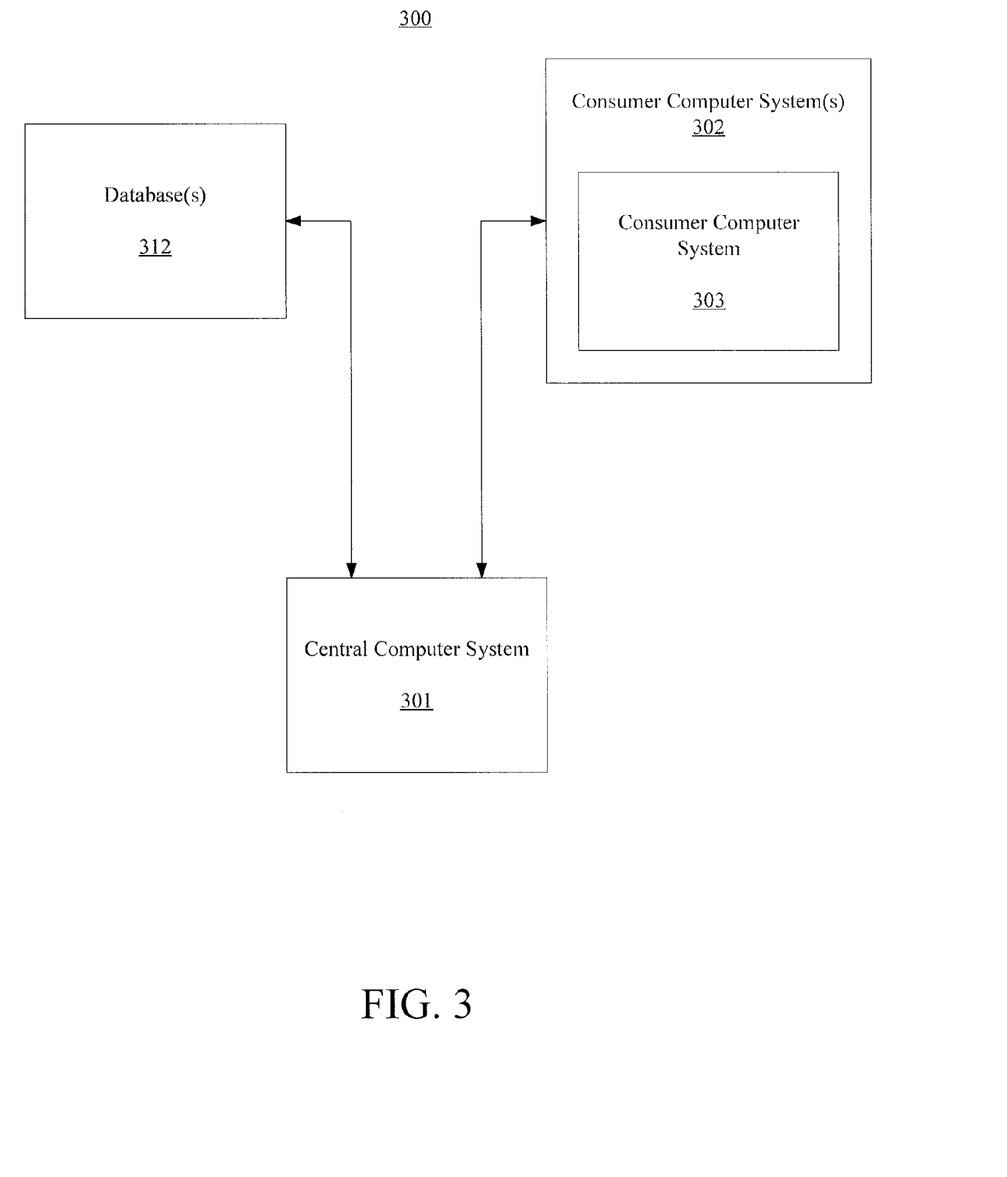
FIG. 3 illustrates a representative block diagram of a system, according to an embodiment.

Skipping ahead now in the drawings, FIG. 3 illustrates a representative block diagram of a system 300, according to an embodiment. System 300 is merely exemplary and embodiments of the system are not limited to the embodiments presented herein. System 300 can be employed in many different embodiments or examples not specifically depicted or described herein. In some embodiments, certain elements or modules of system 300 can perform various methods and/or activities of those methods. In these or other embodiments, the methods and/or the activities of the methods can be performed by other suitable elements or modules of system 300.

As further described in greater detail below, in these or other embodiments, system 300 can proactively (e.g., prospectively) and/or reactively (e.g., responsively) determine and/or communicate the consumer product information to the consumer, as desired. Proactive acts can refer to acts (e.g., identification, determination, communication, etc.) performed without consideration of one or more predetermined acts performed by the consumer and reactive acts can refer to acts (e.g., identification, determination, communication, etc.) performed with consideration of (i.e., in response to) one or more predetermined acts performed by the consumer. For example, in some embodiments, the predetermined act(s) can comprise an act of identifying a selection of a consumer product by the consumer.

Meanwhile, as also described in greater detail below, system 300 can be implemented in brick-and-mortar commerce and/or electronic commerce applications, as desirable. Further, in many of these or other embodiments, system 300 can communicate the consumer product information to the consumer substantially in real-time (e.g., near real-time). Near real-time can mean real-time less a time delay for processing (e.g., determining) and/or transmitting the relevant consumer product information to the relevant consumer. The particular time delay can vary depending on the type and/or amount of the consumer product information, the processing speed(s) of the processing module(s) of system 300, the transmission capability of the communication hardware (as introduced below), the transmission distance, etc. However, in many embodiments, the time delay can be less than approximately one, five, ten, or twenty minutes.

Generally, therefore, system 300 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 300 described herein.

Specifically, system 300 comprises a central computer system 301. In many embodiments, central computer system 301 can be similar or identical to computer system 100 (FIG. 1). Accordingly, central computer system 301 can comprise one or more processing modules and one or more memory storage modules (e.g., one or more non-transitory memory storage modules). In these or other embodiments, the processing module(s) and/or the memory storage module(s) can be similar or identical to the processing module(s) and/or memory storage module(s) (e.g., non-transitory memory storage modules) described above with respect to computer system 100 (FIG. 1). In some embodiments, central computer system 301 can comprise a single computer or server, but in many embodiments, central computer system 301 comprises a cluster or collection of computers or servers and/or a cloud of computers or servers. Meanwhile, central computer system 301 can comprise one or more input devices (e.g., one or more keyboards, one or more keypads, one or more pointing devices such as a computer mouse or computer mice, one or more touchscreen displays, etc.), and/or can comprise one or more display devices (e.g., one or more monitors, one or more touchscreen displays, etc.). In these or other embodiments, one or more of the input device(s) can be similar or identical to keyboard 104 (FIG. 1) and/or a mouse 110 (FIG. 1). Further, one or more of the display device(s) can be similar or identical to monitor 106 (FIG. 1) and/or screen 108 (FIG. 1). The input device(s) and the display device(s) can be coupled to the processing module(s) and/or the memory storage module(s) of central computer system 301 in a wired manner and/or a wireless manner, and the coupling can be direct and/or indirect, as well as locally and/or remotely. As an example of an indirect manner (which may or may not also be a remote manner), a keyboard-video-mouse (KVM) switch can be used to couple the input device(s) and the display device(s) to the processing module(s) and/or the memory storage module(s). In some embodiments, the KVM switch also can be part of central computer system 301. In a similar manner, the processing module(s) and the memory storage module(s) can be local and/or remote to each other.

In many embodiments, central computer system 301 is configured to communicate with one or more consumer computer systems 302 (e.g., a consumer computer system 303) of one or more consumers. For example, the consumer(s) can interface (e.g., interact) with central computer system 301, and vice versa, via consumer computer system(s) 302 (e.g., consumer computer system 303). Accordingly, in many embodiments, central computer system 301 can refer to a back end of system 300 operated by an operator and/or administrator of system 300, and consumer computer system(s) 302 can refer to a front end of system 300 used by one or more users of system 300 (i.e., the consumer(s)). In these or other embodiments, the operator and/or administrator of system 300 can manage central computer system 301, the processing module(s) of computer system 301, and/or the memory storage module(s) of computer system 301 using the input device(s) and/or display device(s) of central computer system 301. In some embodiments, system 300 can comprise consumer computer system(s) 302 (e.g., consumer computer system 303).

Like central computer system 301, consumer computer system(s) 302 each can be similar or identical to computer system 100 (FIG. 1), and in many embodiments, each of consumer computer system(s) 302 can be similar or identical to each other. In many embodiments, consumer computer system(s) 302 can comprise one or more desktop computer devices, one or more wearable user computer devices, and/or one or more mobile devices, etc. At least part of central computer system 301 can be located remotely from consumer computer system(s) 302.

In some embodiments, a mobile device can refer to a portable electronic device (e.g., an electronic device easily conveyable by hand by a person of average size) with the capability to present audio and/or visual data (e.g., images, videos, music, etc.). For example, a mobile device can comprise at least one of a digital media player, a cellular telephone (e.g., a smartphone), a personal digital assistant, a handheld digital computer device (e.g., a tablet personal computer device), a laptop computer device (e.g., a notebook computer device, a netbook computer device), a wearable user computer device, or another portable computer device with the capability to present audio and/or visual data (e.g., images, videos, music, etc.). Thus, in many examples, a mobile device can comprise a volume and/or weight sufficiently small as to permit the mobile device to be easily conveyable by hand. For examples, in some embodiments, a mobile device can occupy a volume of less than or equal to approximately 189 cubic centimeters, 244 cubic centimeters, 1790 cubic centimeters, 2434 cubic centimeters, 2876 cubic centimeters, 4056 cubic centimeters, and/or 5752 cubic centimeters. Further, in these embodiments, a mobile device can weigh less than or equal to 3.24 Newtons, 4.35 Newtons, 15.6 Newtons, 17.8 Newtons, 22.3 Newtons, 31.2 Newtons, and/or 44.5 Newtons.

Exemplary mobile devices can comprise, but are not limited to, one of the following: (i) an iPod®, iPhone®, iPod Touch®, iPad®, MacBook® or similar product by Apple Inc. of Cupertino, Calif., United States of America, (ii) a Blackberry® or similar product by Research in Motion (RIM) of Waterloo, Ontario, Canada, (iii) a Lumia®, Surface Pro™, or similar product by the Microsoft Corporation of Redmond, Wash., United States of America, and/or (iv) a Galaxy™, Galaxy Tab™, Note™, or similar product by the Samsung Group of Samsung Town, Seoul, South Korea. Further, in the same or different embodiments, a mobile device can comprise an electronic device configured to implement one or more of (i) the iOS™ operating system by Apple Inc. of Cupertino, Calif., United States of America, (ii) the Blackberry® operating system by Research In Motion (RIM) of Waterloo, Ontario, Canada, (iii) the Palm® operating system by Palm, Inc. of Sunnyvale, Calif., United States, (iv) the Android™ operating system developed by Google, Inc. of Mountain View, Calif., United States, (v) the Windows Mobile™, Windows Phone™ and Windows 10 (Mobile)™ operating systems by Microsoft Corporation of Redmond, Wash., United States of America, or (vi) the Symbian™ operating system by Nokia Corp. of Keilaniemi, Espoo, Finland.

In further embodiments, central computer system 301 can be configured to communicate with software (e.g., one or more web browsers, one or more mobile software applications, etc.) of the consumer computer system(s) 302 (e.g., consumer computer system 303). For example, the software can run on one or more processing modules and can be stored on one or more memory storage modules (e.g., one or more non-transitory memory storage modules) of the consumer computer system(s) 302 (e.g., consumer computer system 303). In these or other embodiments, the processing module(s) of the consumer computer system(s) 302 (e.g., consumer computer system 303) can be similar or identical to the processing module(s) described above with respect to computer system 100 (FIG. 1). Further, the memory storage module(s) (e.g., non-transitory memory storage modules) of the consumer computer system(s) 302 (e.g., consumer computer system 303) can be similar or identical to the memory storage module(s) (e.g., non-transitory memory storage module(s)) described above with respect to computer system 100 (FIG. 1). Exemplary web browsers can include (i) Firefox® by the Mozilla Organization of Mountain View, Calif., United States of America, (ii) Internet Explorer® by the Microsoft Corp. of Redmond, Wash., United States of America, (iii) Chrome™ by Google Inc. of Menlo Park, Calif., United States of America, (iv) Opera® by Opera Software of Oslo, Norway, and (v) Safari® by Apple Inc. of Cupertino, Calif., United States of America.

Meanwhile, in many embodiments, central computer system 301 also can be configured to communicate with one or more databases 312. The database can comprise a product database that contains information about products sold by a retailer. Database(s) 312 can be stored on one or more memory storage modules (e.g., non-transitory memory storage module(s)), which can be similar or identical to the one or more memory storage module(s) (e.g., non-transitory memory storage module(s)) described above with respect to computer system 100 (FIG. 1). Also, in some embodiments, for any particular database of database(s) 312, that particular database can be stored on a single memory storage module of the memory storage module(s) and/or the non-transitory memory storage module(s) storing database(s) 312, or it can be spread across multiple ones of the memory storage module(s) and/or non-transitory memory storage module(s) storing database(s) 312, depending on the size of the particular database and/or the storage capacity of the memory storage module(s) and/or non-transitory memory storage module(s).

In these or other embodiments, the memory storage module(s) of central computer system 300 can comprise some or all of the memory storage module(s) storing database(s) 312. In further embodiments, some of the memory storage module(s) storing database(s) 312 can be part of consumer computer systems 302 and/or one or more third-party computer systems (i.e., other than central computer system 301 and consumer computer systems 302), and in still further embodiments, all of the memory storage module(s) storing database(s) 312 can be part of consumer computer systems 302 and/or the third-party computer system(s). Like central computer system 301 and consumer computer system(s) 302, when applicable, each of the third-party computer system(s) can be similar or identical to computer system 100 (FIG. 1). Notably, the third-party computer systems are omitted from the drawings to better illustrate that database(s) 312 can be stored at memory storage module(s) of central computer system 301, consumer computer system(s) 302, and/or the third-party computer systems, depending on the manner in which system 300 is implemented.

Database(s) 312 each can comprise a structured (e.g., indexed) collection of data and can be managed by any suitable database management systems configured to define, create, query, organize, update, and manage database(s). Exemplary database management systems can include MySQL (Structured Query Language) Database, PostgreSQL Database, Microsoft SQL Server Database, Oracle Database, SAP (Systems, Applications, & Products) Database, and IBM DB2 Database.

Meanwhile, communication between central computer system 301, consumer computer system(s) 302 (e.g., consumer computer system 303), and/or database(s) 312 can be implemented using any suitable manner of wired and/or wireless communication. Accordingly, system 300 can comprise any software and/or hardware components configured to implement the wired and/or wireless communication. Further, the wired and/or wireless communication can be implemented using any one or any combination of wired and/or wireless communication network topologies (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can comprise Bluetooth, Zigbee, Wireless Universal Serial Bus (USB), Z-Wave, etc. Exemplary LAN and/or WAN protocol(s) can comprise Data Over Cable Service Interface Specification (DOCSIS), institute of Electrical and Electronic Engineers (IEEE) 802.3 (also known as Ethernet), IEEE 802.11 (also known as WiFi), etc. Exemplary wireless cellular network protocol(s) can comprise Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (1S-136/Time Division Multiple Access (TDMA)), Integrated Digital Enhanced Network (iDEN), Evolved High-Speed Packet Access (HSPA+), Long-Term Evolution (LTE), WiMAX, and the like. The specific communication software and/or hardware implemented can depend on the network topologies and/or protocols implemented, and vice versa. In many embodiments, exemplary communication hardware can comprise wired communication hardware including, for example, one or more data buses, such as, for example, universal serial bus(es), one or more networking cables, such as, for example, coaxial cable(s), optical fiber cable(s), and/or twisted pair cable(s), any other suitable data cable, etc. Further exemplary communication hardware can comprise wireless communication hardware including, for example, one or more radio transceivers, one or more infrared transceivers, etc. Additional exemplary communication hardware can comprise one or more networking components (e.g., modulator-demodulator components, gateway components, etc.)

For convenience, the functionality of system 300 is described herein as it relates particularly to consumer computer system 303 and a single consumer. But in many embodiments, the functionality of system 300 can be extended to each of consumer computer system(s) 302 and/or to multiple consumers. In these extended examples, in some embodiments, single consumers can interface (e.g., interact) with central computer system 301 with multiple consumer computer systems of consumer computer system(s) 302 (e.g., at different times). For example, a consumer could interface with central computer system 301 via a first consumer computer system (e.g., a desktop computer), such as, for example, when interfacing with central computer system 301 from home, and via a second consumer computer system (e.g., a mobile device), such as, for example, when interfacing with central computer system 301 away from home.

There are many instances in which an entity might desire the processing of a large amount of data. One such example includes electronic commerce ("eCommerce") retailers. Retailers are interested in how their customers behave for a variety of reasons. Retailers want to determine which products are searched for, which terms are used for searches, which products are purchased, which promotions work, which page layout is most optimum, and the like. Some of these tasks can be referred to as signal query jobs. While reference might be made to methods being used to execute signal query jobs, it should be understood that methods and systems described herein can be used for any type of computing job.

Often times, such data is voluminous. Some retailers may receive up to 200 gigabytes (GB) of input data each day in the form of customer input. This 200 GB of input data is processed to determine, for example, which products are searched for, which terms are used for searches, which products are purchased, which promotions work, which page layout is most optimum, and the like. The resulting output data might be much smaller, on the order of 1 GB or less. Such imbalanced data output size can result in several tiny data chunks that might have to be combined. The processing parallelism is determined primarily by the size of the input data.

The processing of the input data into the output data can be computationally intense. To handle the vast amount of processing, the computations might be performed by a plurality of computers, using physical machines, virtual machines (an emulated machine), or a combination of the two. It should be understood that any reference to a "virtual machine" in this specification can also refer to a physical machine and vice versa. The plurality of computers should be scheduled to create an optimum processing pipeline. The allocation of not enough processing power for a particular task can result in slower processing than would otherwise be possible. In addition, the allocation of too much processing power for a task can also result in slower processing speeds.

Figure 4:
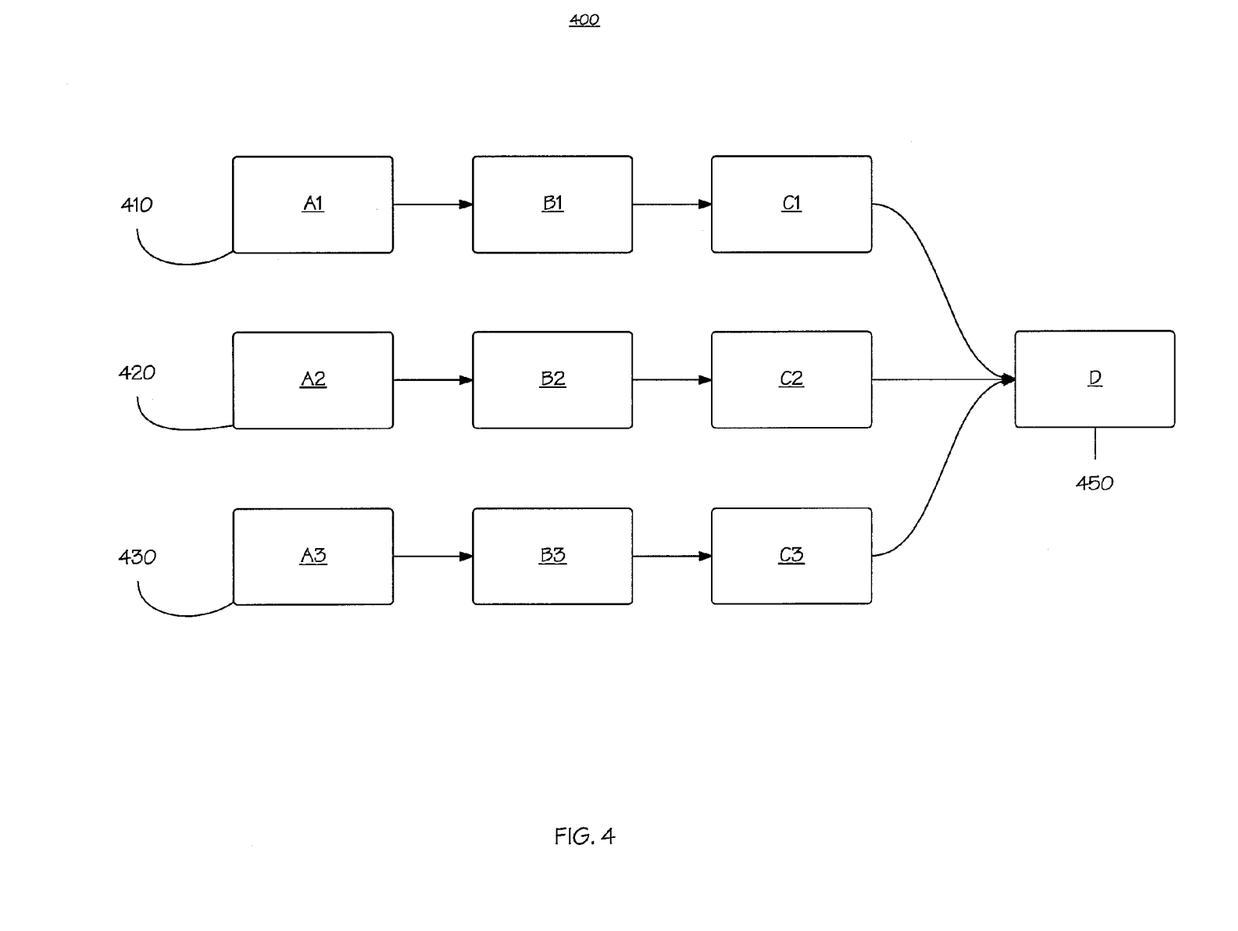
FIG. 4 is a flowchart diagram illustrating the flow of instructions through multiple computing systems.

The reason for this result is that the use of a plurality of computers is combined with parallel processing of a series of tasks. With reference to FIG. 4, a set of computing pipelines is illustrated. Present in FIG. 4 are pipeline 410 comprising threads A1, B1, and C1, pipeline 420 comprising threads A2, B2, and C2, and pipeline 430 comprising threads A3, B3, and C3. Each pipeline might be executing a different signal query job. For each pipeline, the result of one thread might have to wait for the previous thread. For example, thread B1 cannot execute until thread A1 has completed. In addition, there might be an overall computing thread 450 that uses the results from each of pipelines 410, 420, and 430.

An over-allocation of computing power to pipeline 410 might result in pipeline 410 being processed more quickly than would otherwise occur. However, an over-allocation of computing power to pipeline 410 might result in an under-allocation of computing power to pipelines 420 and 430, resulting in thread 450 having to wait for pipelines 420 and 430 to finish. Thus, it might be preferable to allocate computing power among pipelines 410, 420, and 430 more evenly for better performance of pipelines 410, 420, and 430 as a whole.

In addition, an over-allocation of computing resources can result in a data merge step. Referring back to FIG. 4, if too many computing resources is devoted to pipeline 410, an output of one stage of pipeline 410 can become very fragmented because each machine allocated to pipeline 410 can produce an output. The fragmented data might require a data merge step before processing can begin on subsequent stages of pipeline 410 or at thread 450. A proper allocation of computing resources to pipeline 410 can reduce the number of output files, lessening a need for a data merge step before a subsequent stage of pipeline 410 begins.

Between jobs of different stages in a pipeline (e.g., between stages A1 and B1), intermediate results might be generated as input for a subsequent stage (such as stage B1). The number of files in the intermediate result might be proportional to a number of virtual machines being used to process the signal query data. When many small files are created, additional merging tasks might be necessary before the subsequent stage for better efficiency. The result can be extra computation and latency. Therefore, a method and system to intelligently determine the amount of computing resources being used can be a key factor to control the latency of such a system. Therefore, while traditional methods of computing resource allocation might only look at the size of the input data, a more efficient method of computing resource allocation might examine several aspects of computing jobs.

Figure 5:
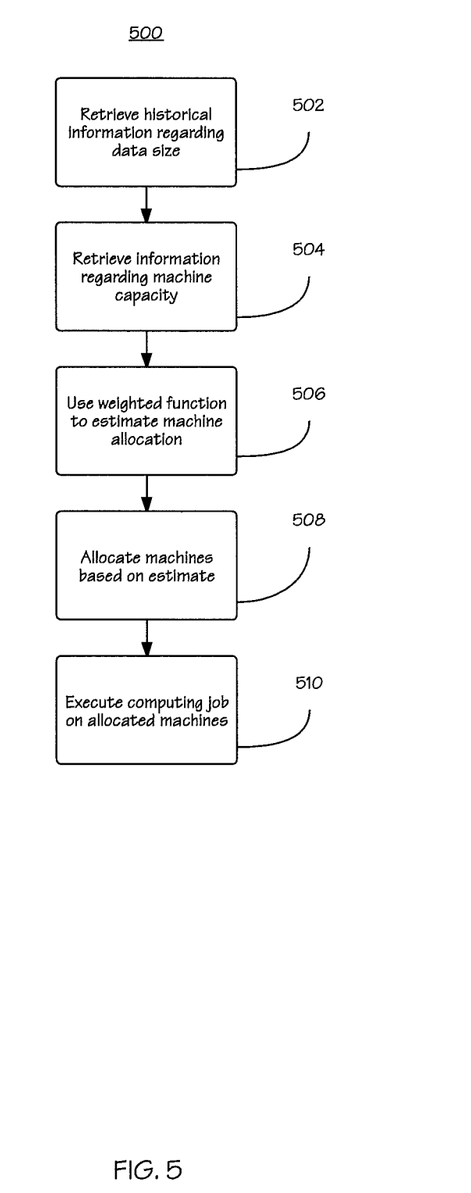
FIG. 5 is a flowchart illustrating the operation of an embodiment.

A flowchart illustrating a method 500 of determining computing resource allocation is presented in FIG. 5. Method 500 is merely exemplary and is not limited to the embodiments presented herein. Method 500 can be employed in many different embodiments or examples not specifically depicted or described herein. In some embodiments, the procedures, the processes and/or the activities of method 500 can be performed in the order presented. In other embodiments, the procedures, the processes, and/or the activities of method 500 can be performed in any other suitable order. In still other embodiments, one or more of the procedures, the processes, and/or the activities of method 500 can be combined or skipped. In some embodiments, portions of method 500 can be implemented by computer system 100 (FIG. 1).

Method 500 might be executed by any person or entity who wishes to process a large amount of data in a quick and efficient manner as possible. An exemplary entity that might wish to use method 500 is an entity examining a clickstream of visits to a website. A clickstream is a recording of the parts of a screen that a computer user clicks on while browsing the web. When a user clicks anywhere on a webpage, the action is logged, such as by a webserver. Data such as which items were viewed, what search terms were used, where a user came from, how long a user was at a webpage, and the like can be very important to a website owner, as they would typically like to be able to track their visitors.

The input data can be used to generate metrics that can be used to track visitors and improve their experience. Between jobs of different stages in a workflow (e.g., between stages A1 and B1), intermediate results are generated as input to the next stage. The number of files ($n_f$) in the intermediate results can be proportional to the number of virtual machines ($n_{vm}$) being used to process the input data as follows:

$$n_f = \lambda n_{vm}, \text{ where } \lambda \text{ is a constant.}$$

The prediction of output size can be improved by using an average of historical ratios of input data to output data. Historical information regarding input data size and historical output data size is retrieved (block 502). The input data size can be retrieved regarding similar signal query jobs because each type of signal query job might have different computing requirements. Output data size can be retrieved regarding each set of input data for which size information was retrieved. In some embodiments, signal queries can be executed on a regular basis (e.g., daily or weekly). So each time method 500 is executed, there can be more available information for input data size that will enable method 500 to be more accurate each time it is executed. In addition to the historical data, information regarding the capacity of a computing machine is retrieved (block 504). The capacity indicates how much data a computing machine is capable of processing. Capacity can be dependent on a variety of different factors, including memory size, processor speed, number of processors, and other characteristics that can indicate a machine's capabilities. Capacity can be measured in one of a variety of different manners. In some embodiments, capacity is measured in terms of "Task Slots," where each slot indicates the ability to run a single task. Typically, a job requires hundreds of such task slots, whereas a single computing machine can provide up to 16 to 24 task slots, depending on the specifications of the machine.

A computing machine can be a physical machine, a virtual machine, or the like. In some embodiments, a computing machine can be central computer system 301 of FIG. 3. A computing machine might be one computing machine of a set of computing machines. In some embodiments, each computing machine in the set of computing machines might have a similar capacity. In embodiments where the set of computing machines do not each have a similar capacity, an average capacity might be used.

A weighted function can be used that can be applied to the size of the current input data and the size of the output data to estimate the number of computing machines that should be allocated to complete a signal query job (block 506). In one embodiment, the number of computing machines to complete the signal query jobs $n_{vm}$ can be determined by the following equation:

$$n_{vm} = \frac{N_o}{N_i R_t} \times N,$$

where $N_o$ is the average historical size of the output data; $N_i$ is the average historical size of the input data; $R_t$ is the capacity of a computing machine; and $N$ is the size of the current input data.

$N_i$ and $N_o$ can be weighted in a variety of different manners. They can be used with an exponential factor or a decaying factor to give differing weights to pieces of the historical data. For example, greater weight can be given to more recent historical data.

After the function (weighted or not) is used to determine a number of computing machines to allocate to the signal query job, the requisite number of computing machines can be allocated or assigned to the signal query job (block 508). The signal query job is then executed on the allocated computing machines (block 510).

Using such an adaptive approach leverages historical statistics to dynamically adjust the number of virtual machines used. This approach is helpful to reduce the latency of signal query jobs and remove excessive computation. This approach results in a more efficient allocation of computing resources, allowing resources to be used for other purposes. Furthermore, the overall runtime of the job has improved due to the reduced need of a data merge step. In addition, selectively scaling jobs reduces cluster capacity expansion for data volume ramp-up and reduces operating costs.

Figure 6:
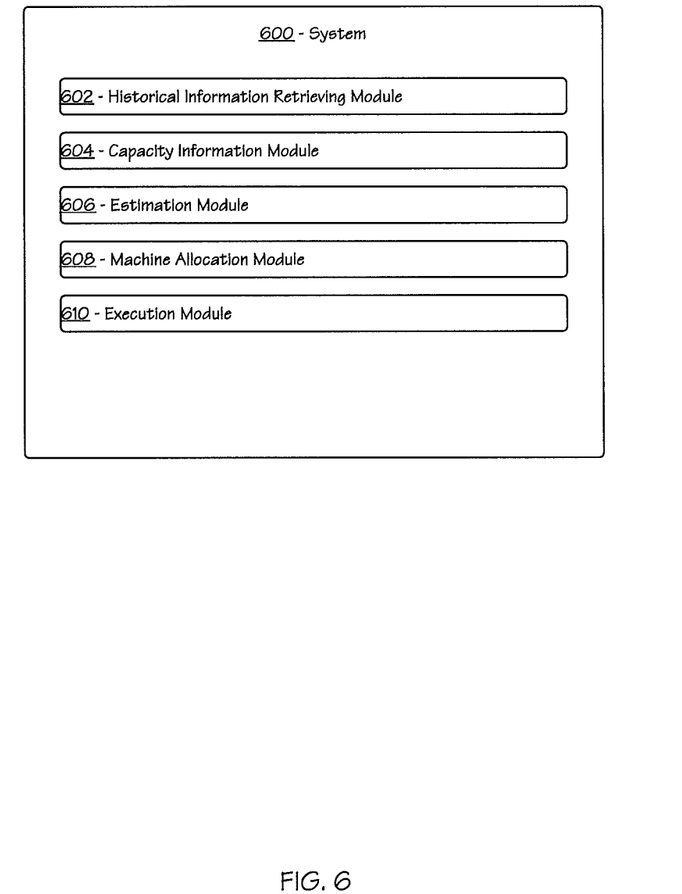
FIG. 6 is a block diagram illustrating a system capable of performing an embodiment.

Turning ahead in the figures, FIG. 6 illustrates a block diagram of a system 600 that is capable of performing disclosed embodiments. System 600 is merely exemplary and is not limited to the embodiments presented herein. System 600 can be employed in many different embodiments or examples not specifically depicted or described herein. In some embodiments, certain elements or modules of system 600 can perform various procedures, processes, and/or acts. In other embodiments, the procedures, processes, and/or acts can be performed by other suitable elements or modules.

In a number of embodiments, system 600 can include historical information receiving module 602. In certain embodiments, historical information receiving module 602 can perform block 502 (FIG. 5) of receiving historical information regarding data size.

In a number of embodiments, system 600 can include capacity information module 604. In certain embodiments, capacity information module 604 can perform block 504 (FIG. 5) of receiving information regarding virtual machine capacity.

In a number of embodiments, system 600 can include estimation module 606. In certain embodiments, estimation module 606 can perform block 506 (FIG. 5) of estimating a number of machines to complete a signal query job.

In a number of embodiments, system 600 can include machine allocation module 608. In certain embodiments, machine allocation module 608 can perform block 508 (FIG. 5) of allocating machines to a signal query job based on an estimate.

In a number of embodiments, system 600 can include execution module 610. In certain embodiments, execution module 610 can perform block 510 (FIG. 5) of executing a signal query job on the allocated machines.

Although the above embodiments have been described with reference to specific embodiments, it will be understood by those skilled in the art that various changes can be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-6 can be modified, and that the foregoing discussion of certain of these embodiments does not necessarily represent a complete description of all possible embodiments. For example, one or more of the procedures, processes, or activities of FIGS. 1-6 can include different procedures, processes, and/or activities and be performed by many different modules, in many different orders.

Replacement of one or more claimed elements constitutes reconstruction and not repair. Additionally, benefits, other advantages, and solutions to problems have been described with regard to specific embodiments. The benefits, advantages, solutions to problems, and any element or elements that can cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A system comprising:
one or more processors; and
one or more non-transitory computer-readable media storing computing instructions configured to run on the one or more processors and perform acts of:
receiving first data regarding historical data of input size for a particular computing task;
receiving second data regarding historical data of output size for the particular computing task;
receiving capacity data indicating a capacity of each computing machine of a set of computing machines;
determining a desired number of computing machines of the set of computing machines to assign to a computing job in view of the first data, the second data, and the capacity data; and
allocating the desired number of computing machines of the set of computing machines to the computing job;
wherein:
determining the desired number of computing machines of the set of computing machines to assign to the computing job comprises:
using a function to determine the desired number of computing machines of the set of computing machines based on the historical data of input size and the historical data of output size;
the function is further based on the capacity of each computing machine of the set of computing machines; and
the function has a form:

$$n_{vm} = \frac{N_o}{N_i R_t} \times N,$$

where $N_o$ is data regarding the historical data of input size for the particular computing task, $N_i$ is data regarding the historical data of output size for the particular computing task, $R_t$ is a capacity of a single computing machine of the set of computing machines, and N is a size of current input data of the computing job.

2. The system of claim 1, wherein:
a weighting is applied to the function to give greater weight to at least a portion of at least one of (1) the historical data of input size for the particular computing task or (2) the historical data of output size for the particular computing task, whichever is more recent in time.

3. The system of claim 2, wherein:
the weighting is an exponential factor.

4. The system of claim 1, wherein:
each computing machine of the set of computing machines is a virtual machine.

5. The system of claim 1, wherein:
a weighting is applied to the function to give greater weight to at least a portion of at least one of (1) the historical data of input size for the particular computing task or (2) the historical data of output size for the particular computing task, whichever is more recent in time;
the weighting is an exponential factor; and
each computing machine of the set of computing machines is a virtual machine.

6. A method comprising:
receiving first data regarding historical data of input size for a particular computing task;
receiving second data regarding historical data of output size for the particular computing task;
receiving capacity data indicating a capacity of each computing machine of a set of computing machines;
determining a desired number of computing machines of the set of computing machines to assign to a computing job in view of the first data, the second data, and the capacity data; and
allocating the desired number of computing machines of the set of computing machines to the computing job;
wherein:
determining the desired number of computing machines of the set of computing machines to assign to the computing job comprises:
using a function to determine the desired number of computing machines of the set of computing machines based on the historical data of input size and the historical data of output size;
the function is further based on the capacity of each computing machine of the set of computing machines; and
the function has a form:

$$n_{vm} = \frac{N_o}{N_i R_t} \times N,$$

where $N_o$ is data regarding the historical data of input size for the particular computing task, $N_i$ is data regarding the historical data of output size for the particular computing task, $R_t$ is a capacity of a single computing machine of the set of computing machines, and N is a size of current input data of the computing job.

7. The method of claim 6, wherein:
a weighting is applied to the function to give greater weight to at least a portion of at least one of (1) the historical data of input size for the particular computing task or (2) the historical data of output size for the particular computing task, whichever is more recent in time.

8. The method of claim 7, wherein:
the weighting is an exponential factor.

9. The method of claim 6, wherein:
each computing machine of the set of computing machines is a virtual machine.

10. The method of claim 6, wherein:
a weighting is applied to the function to give greater weight to at least a portion of at least one of (1) the historical data of input size for the particular computing task or (2) the historical data of output size for the particular computing task, whichever is more recent in time;
the weighting is an exponential factor; and
each computing machine of the set of computing machines is a virtual machine.

11. A non-transitory computer-readable storage medium having data stored therein representing software executable by a computer, the non-transitory computer-readable storage medium comprising:
instructions for receiving first data regarding historical data of input size for a particular computing task;
instructions for receiving second data regarding historical data of output size for the particular computing task;
instructions for receiving capacity data indicating a capacity of each computing machine of a set of computing machines;
instructions for determining a desired number of computing machines of the set of computing machines to assign to a computing job in view of the first data, the second data, and the capacity data; and
instructions for allocating the desired number of computing machines of the set of computing machines to the computing job;
wherein:
determining the desired number of computing machines of the set of computing machines to assign to the computing job comprises:
using a function to determine the desired number of computing machines of the set of computing machines based on the historical data of input size and the historical data of output size;
the function is further based on the capacity of each computing machine of the set of computing machines; and
the function has a form:

$$n_{vm} = \frac{N_o}{N_i R_t} \times N,$$

where $N_o$ is data regarding the historical data of input size for the particular computing task, $N_i$ is data regarding the historical data of output size for the particular computing task, $R_t$ is a capacity of a single computing machine of the set of computing machines, and N is a size of current input data of the computing job.

12. The non-transitory computer-readable storage medium of claim 11, wherein:
a weighting is applied to the function to give greater weight to at least a portion of at least one of (1) the historical data of input size for the particular computing task or (2) the historical data of output size for the particular computing task, whichever is more recent in time;
the weighting is an exponential factor; and
each computing machine of the set of computing machines is a virtual machine.

13. The non-transitory computer-readable storage medium of claim 11, wherein a weighting is applied to the function to give greater weight to at least a portion of at least one of (1) the historical data of input size for the particular computing task or (2) the historical data of output size for the particular computing task, whichever is more recent in time.

14. The non-transitory computer-readable storage medium of claim 13, wherein the weighting is an exponential factor.

15. The non-transitory computer-readable storage medium of claim 11, wherein each computing machine of the set of computing machines is a virtual machine.

* * * * *